United States Patent
Kakehi et al.

(10) Patent No.: US 8,244,657 B2
(45) Date of Patent: Aug. 14, 2012

(54) MULTI-OBJECTIVE OPTIMIZATION USING WEIGHT ADJUSTMENT OF INITIAL AND CORRECTED SOLUTIONS

(75) Inventors: Minoru Kakehi, Tokyo (JP); Rika Kusuda, Yokohama (JP); Takashi Yonezawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 12/362,165

(22) Filed: Jan. 29, 2009

(65) Prior Publication Data

US 2009/0192973 A1 Jul. 30, 2009

(30) Foreign Application Priority Data

Jan. 29, 2008 (JP) .................................. 2008-017901

(51) Int. Cl.
*G06F 17/00* (2006.01)
(52) U.S. Cl. ........................................................ 706/45
(58) Field of Classification Search .................... 706/12, 706/45, 52, 62; 705/1.1, 7, 301
See application file for complete search history.

(56) References Cited

U.S. PATENT DOCUMENTS

| | | | |
|---|---|---|---|
| 2003/0149613 A1* | 8/2003 | Cohen et al. | 705/11 |
| 2006/0052984 A1* | 3/2006 | Nakadate et al. | 702/182 |
| 2006/0117303 A1* | 6/2006 | Gizinski | 717/136 |
| 2007/0050069 A1* | 3/2007 | Treichler et al. | 700/99 |
| 2007/0168057 A1* | 7/2007 | Blevins et al. | 700/53 |
| 2009/0006156 A1* | 1/2009 | Hunt et al. | 705/7 |

FOREIGN PATENT DOCUMENTS

| | | |
|---|---|---|
| JP | PUPA10-40286 | 2/1995 |
| JP | PUPA7-44611 | 2/1998 |

* cited by examiner

*Primary Examiner* — David Vincent
(74) *Attorney, Agent, or Firm* — Yee & Associates, P.C.; David A. Mims, Jr.

(57) ABSTRACT

A multi-objective optimization apparatus provides a weight adjustment apparatus, method, and computer program product, to perform optimization while reflecting user's demands. The multi-objective optimization apparatus for adjusting weights of a plurality of evaluation items includes a correction accepting unit for accepting an operation for correcting an initial solution as one of solutions to the plurality of evaluation items, and a weight adjustment unit for adjusting weights of the plurality of evaluation items using the initial solution based on the corrected solution as a corrected initial solution.

23 Claims, 12 Drawing Sheets

FIG. 12

MULTI-OBJECTIVE OPTIMIZATION USING WEIGHT ADJUSTMENT OF INITIAL AND CORRECTED SOLUTIONS

CROSS REFERENCE TO RELATED APPLICATIONS

This application claims-priority to Japan Foreign Patent Application No. 2008-17901 entitled "MULTI-OBJECTIVE OPTIMIZATION APPARATUS, WEIGHT ADJUSTMENT METHOD AND WEIGHT ADJUSTMENT PROGRAM", filed on Jan. 29, 2008, and claiming the same priority date, which is incorporated herein by reference and assigned to the assignee herein.

TECHNICAL FIELD

The present invention relates to a multi-objective optimization apparatus, and weight adjustment method and program for multi-objective optimization.

BACKGROUND ART

Hitherto, various kinds of tools have been developed by applying an optimization technique of selecting the best one from among plural alternatives under predetermined conditions. In most of the above optimization tools, an output optimization result does not match with an actual operation or needs of a user. In short, the optimization tools give a solution different from what a user demands.

To obtain a solution that a user requires, parameters (weights assigned to evaluation items for outputting an optimization result) could be adjusted. However, it is important to understand the algorithm of each optimization tool for adjusting parameters. In general, it is not easy for a user to understand even the meaning of the parameters. In this case, however, each user needs to manually adjust the parameters.

For example, as for evaluation items directly related to a business such as cost and lead time, a user can adjust weights of these items. However, it is difficult for a user to adjust parameters for evaluating the working time of a plurality of vehicles, that is, determining whether to keep the balance therebetween or not.

To adjust such parameters, a user should be familiar with both of an operation and an optimization tool. Thus, in many cases, a user makes adjustment with the help of an engineer. It is difficult for a user to directly adjust parameters in some cases. Further, the number of optimization evaluation items increases along with an increase in the number of constraints set by a user, which makes it more difficult to adjust parameters.

On the other hand, another approach is for applying an optimization result to an actual operation after a user manually adjusts the optimization result, not adjusting parameters. For example, in general schedule optimization applications or the like, if a user is not satisfied with an output result, the optimum solution itself is edited as the user desires to satisfy user's requests instead of adjusting parameters. This approach adjusts the output result, not the parameters that a user cannot easily understand.

However, if data is partially corrected, an optimum solution of the entire data is changed, so the whole schedule needs to be revised. Hence, there is no point to execute optimization in a system since the user needs to edit the solution each time, which considerably lowers operation efficiency.

In such circumstances, a method for solving the problems involved in the multi-objective optimization has been proposed (for example, Patent Documents 1 and 2 described below). According to the method disclosed in Patent Document 1, in the case of determining values of plural components in a target system with an optimization method so as to obtain desired characteristics of the system, individual calculating means for finding a solution that satisfies each evaluation function is provided, and plural optimum solutions are obtained using the individual calculating means. According to the method disclosed in Patent Document 2, an initial solution S is generated to determine a search parameter for determining probability of transition to a new solution and then, a solution S' approximate to the solution S is obtained to determine probability of transition to the solution S' for each objective function to determine the total probability of transition to the solution S'. Then, if the total transition probability is larger than a threshold value, the solution S' is set as a new solution S, and the step of determining a search parameter and subsequent steps are repeated. If the probability is smaller than a threshold value, the solution S' is not set as a new solution S, and the step of determining a search parameter and subsequent steps are repeated.

[Patent Document 1]
Japanese Patent Application Publication No. 10-40286
[Patent Document 2]
Japanese Patent Application Publication No. 7-44611

DISCLOSURE OF THE INVENTION

Each of the methods disclosed in these publications adjusts a parameter for obtaining an optimum solution, but each method does not reflect user's demands. Thus, each method cannot overcome the problem that the solution differs from what a user demands.

The present invention provides a multi-objective optimization apparatus using a weight adjustment method, and a weight adjustment program product, which are directed to perform optimization while reflecting user's demands.

According to one aspect of the present invention, a multi-objective optimization apparatus adjusts weights of a plurality of evaluation items for multi-objective optimization. The multi-objective optimization apparatus includes a correction accepting unit and a weight adjustment unit. The correction accepting unit accepts an operation for correcting an initial solution as one of solutions to the plurality of evaluation items. The initial solution is, for example, obtained by executing an optimization program stored in a storage unit of the multi-objective optimization apparatus. The weight adjustment unit adjusts weights of the plurality of evaluation items using the initial solution based on the corrected solution as the corrected initial solution. The weight adjustment unit adjusts weights of the plurality of evaluation items such that an objective function value corresponding to the corrected solution is equivalent or superior to an objective function value corresponding to the initial solution. The fact that an objective function value corresponding to the corrected solution is equivalent or superior to an objective function value corresponding to the initial solution means that, as for optimization to obtain the minimum value, an objective function value corresponding to the corrected solution is smaller than an objective function value corresponding to the initial solution and that, as for optimization to obtain the maximum value, an objective function value corresponding to the corrected solution is larger than an objective function value corresponding to the initial solution. The weight adjustment is based on a calculation result obtained through linear programming, for example.

According to another aspect of the present invention, the multi-objective optimization apparatus further includes an optimum solution calculating unit for calculating an optimum solution based on the weights of the plurality of evaluation items adjusted with the weight adjustment unit. Further, the multi-objective optimization apparatus adjusts weights of the plurality of evaluation items using the initial solution and the corrected solution based on the optimum solution.

According to yet another aspect of the present invention, the multi-objective optimization apparatus further includes a GUI (Graphical User Interface) unit. The GUI unit updates, when the correction accepting unit accepts an operation of a GUI (Graphical User Interface), the GUI using the optimum solution obtained with the optimum solution calculating unit along with an operation of receiving the corrected solution with the correction accepting unit.

As another aspect of the present invention, a weight adjustment method and a weight adjustment program executable with a computer for multi-objective optimization is provided.

Examples of using embodiments of the present invention are given below.

Firstly, a user corrects an initial solution obtained with an optimization program to thereby adjust weights of a plurality of evaluation items based on the corrected solution. Hence, the weights of the plurality of evaluation items reflect user's demands, and a solution similar to what a user demands is obtained. Further, a calculation result obtained through linear programming is used, so a general-purpose method can be applied and implemented in an apparatus.

Secondly, an optimum solution is obtained based on the adjusted weights of the plurality of evaluation items, so the weights of the plurality of evaluation items, which reflect user's demands, are applied to all solutions and thus can be applied to new input data.

Thirdly, even if a new solution to the new input data does not match with user's demands, the solution is edited to further adjust parameters to thereby obtain an optimization result that reflects user's demands.

Fourthly, a correction operation of a GUI triggers automatic optimization to display an optimum solution, so a user can be provided with simple operational environment based on a GUI and an optimum solution as an operational result. Thus, an easy-to-understand optimum solution can be displayed.

According to embodiments of the present invention, a multi-objective optimization apparatus is provided that uses a weight adjustment method and a weight adjustment program, which can execute optimization while reflecting user's demands.

DETAILED DESCRIPTION

Figure 1:
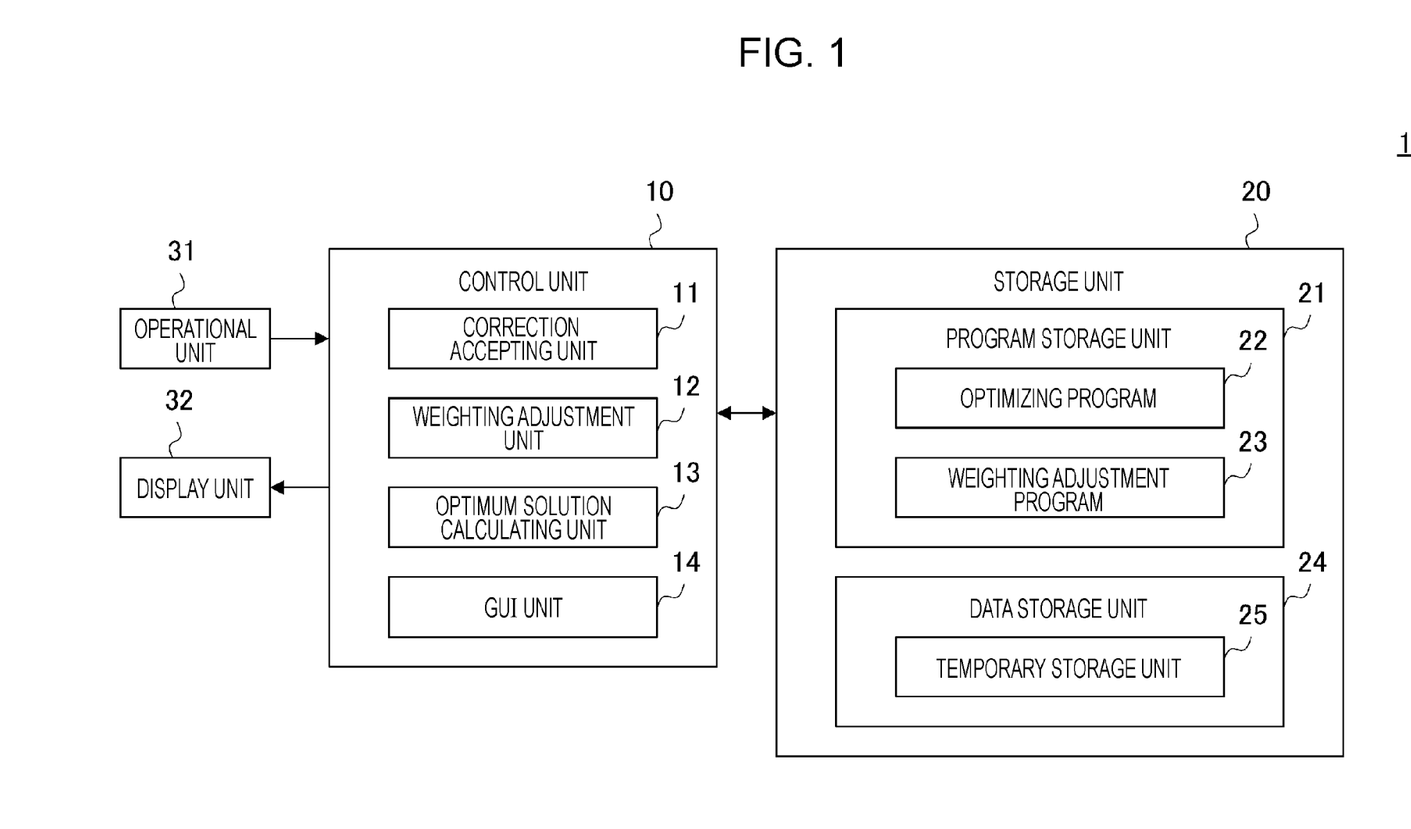
FIG. 1 shows an example of the configuration of a multi-objective optimization apparatus according to an embodiment of the present invention.

Hereinafter, an embodiment of the present invention is described with reference to the accompanying drawings. FIG. 1 shows an example of the configuration of a multi-objective optimization apparatus 1 of this embodiment. The multi-objective optimization apparatus 1 includes a control unit 10, a storage unit 20, an operational unit 31, and a display unit 32. The multi-objective optimization apparatus 1 includes, as the control unit 10, a correction accepting unit 11, a weight adjustment unit 12, an optimum solution calculating unit 13, and a GUI unit 14. The correction accepting unit 11 receives an operation signal from the operational unit 31. The weight adjustment unit 12 adjusts weights of evaluation items in accordance with the received operation signal. The optimum solution calculating unit 13 obtains an optimum solution based on the evaluation items subjected to weight adjustment. The GUI unit 14 edits the adjusted optimum solution into a format suitable for a GUI operation to display the solution on the display unit 32.

The storage unit 20 includes a program storage unit 21 and a data storage unit 24. The program storage unit 21 includes an optimization program 22 and a weight adjustment program 23. The optimization program 22 refers to a computer program executed by a general optimization tool equipped with an optimization technique. This program is used to obtain an initial solution. The weight adjustment program 23 is a computer program for outputting an optimum solution that is closer to the user's requests. Here, the term initial solution means a solution to optimization before user's adjustment, and the term optimum solution means an optimum solution after user's adjustment. The data storage unit 24 includes a temporary storage unit 25 for calculation.

The operational unit 31 may include, for example, a mouse or a keyboard. Further, the display unit 32 may include, for example, a liquid crystal display (LCD).

Figure 2:
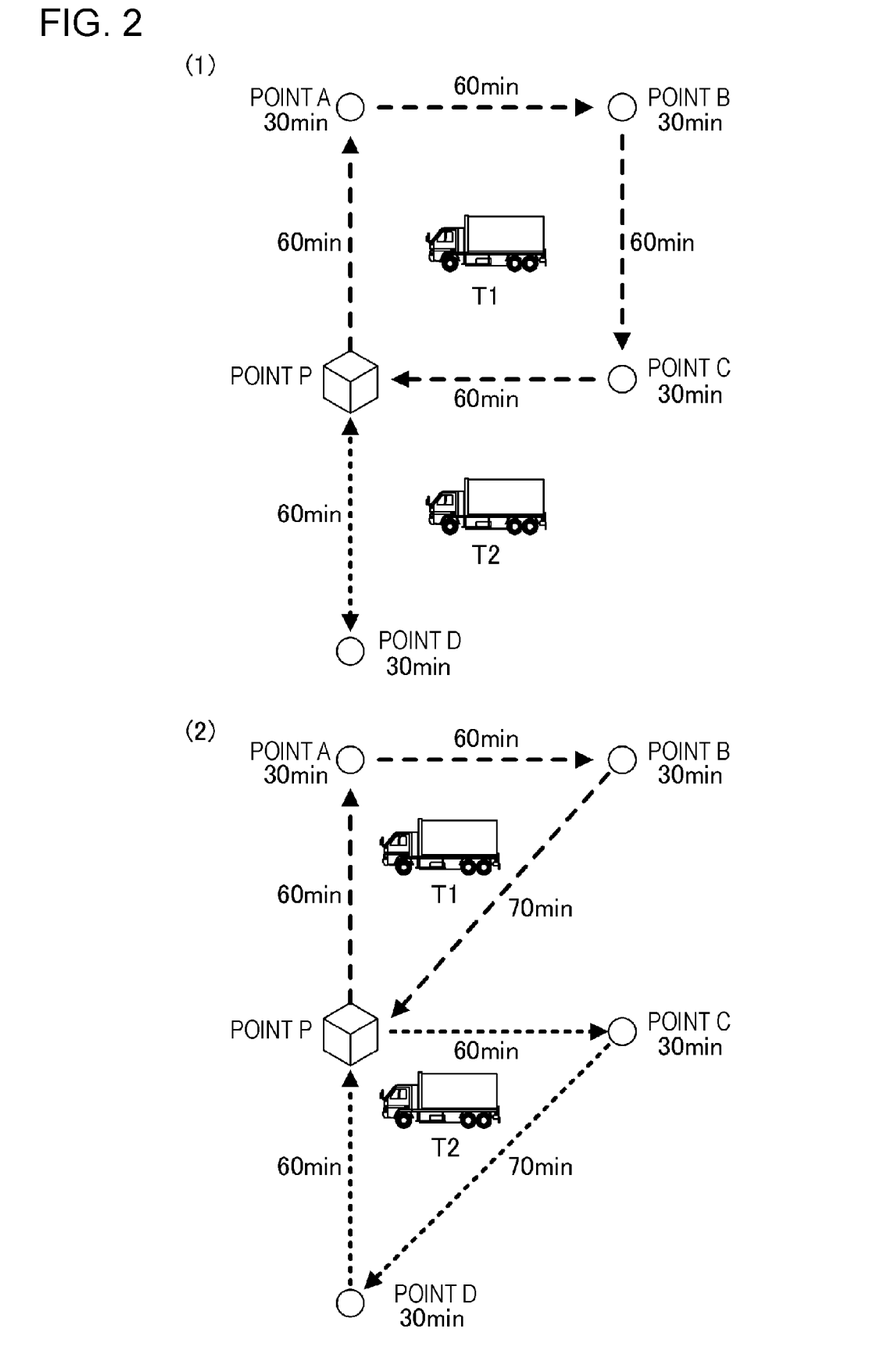
FIG. 2 shows a specific example according to an embodiment of the present invention.

Next, a description of the present invention is described by way of specific examples. FIG. 2 show a specific example of an embodiment and illustrates an example of optimization for a distribution route for delivering a package from a base P to a point A and a point D by two trucks T1 and T2.

FIG. 2 item (1) shows an example of an optimized delivery route output with the optimization program 22 (see FIG. 1). The truck T1 delivers a package to three points from point A to point C, and the truck T2 delivers a pack to one point, a point D. If tai represents a working time of a vehicle i, an average index tbi of the vehicle working time is derived from the following expression.

[Expression 1]

$$tbi = tai * tai$$

Further, a deviation index tci of the vehicle working time is derived from the following expression.

[Expression 2]

$$tci = sqrt(tai)$$

An objective function value z is derived from the following expression based on the above values.

[Expression 3]

$$z = wa\Sigma tai + wb\Sigma tbi + wc\Sigma tci$$

The objective function value is a quantified objective of optimization. This value represents the likability of a target solution. Further, w (wa, wb, and wc) represents a weight. In this example, the optimization program 22 minimizes the total running time of the vehicle i, so the solution is obtained under the condition that wa=1, and wb=wc=0.

Specifically, the truck T1 moves in the order of P→A→B→C→P, so the total working time (min) of the truck T1 is calculated as follows: 60 (min)×4+30 (min)×3=330 (min). On the other hand, the truck T2 moves in the order of P→D→P, so the total working time (min) of the truck T2 is similarly calculated as follows: 60 (min)×2+30 (min)=150 (min). The calculation results of Expressions (1) and (2) are summarized in the following table.

TABLE 1

|    | Tai | tbi     | Tci  |
|----|-----|---------|------|
| T1 | 330 | 108,900 | 18.2 |
| T2 | 150 | 32,500  | 12.2 |

Here, consider the case where a user changes a delivery schedule such that the truck T2 delivers a pack to the point C from the route of FIG. 2(1) (i.e., FIG. 2(2)). In other words, a solution obtained with the optimization program 22 is changed to preferentially average the vehicle working time. More specifically, the movement (solution) of the truck T1 is changed from P→A→B→C→P to P→A→B→P, and the movement (solution) of the truck T2 is changed from P→D→P to P→C→D→P.

In this case, tai, tbi, and tci are calculated as shown in the following table.

TABLE 2

|  | Tai | tbi | Tci |
|---|---|---|---|
| T1 | 250 | 62,500 | 15.8 |
| T2 | 250 | 62,500 | 15.8 |

Next, the objective function value z is calculated based on Expression 3. Assuming that z1 represents the objective function value of FIG. 2(1) and z2 represents the objective function value of FIG. 2(2), if wa (standard value)=1, and wb (standard value)=wc (standard value)=0, $z1=(330+150)+0+0=480$ $z2=(250+250)+0+0=500.$ In this example, z1<z2, and the objective function value of FIG. 2(2) is inferior to that of FIG. 2(1).

Here, the weight adjustment program 23 (see FIG. 1) automatically adjusts wa, wb, and wc so as to make the result of changing a solution by a user be optimal. First, the program executes adjustment so as to obtain the same objective function value before and after edition, after the weight adjustment.

$480wa'+131400wb'+30.4wc'=500wa'+12500wb'+31.6wc'$

This expression includes three variables in one equation, so the degree of freedom is 2. In this case, a value similar to the original weight w is selected. For example, a weight is selected so as to obtain the maximum inner product. Therefore, wa=1, wa'=0.999990234 wb=0, wb'=0.003124969 wc=wc'=0.

A new weight w' is calculated.

However, a solution for the new weight w', which is edited by a user is not necessarily optimum. Hence, a solution changed by a user based on the new weight w' is set as an initial solution to obtain an optimum solution.

Figure 3:
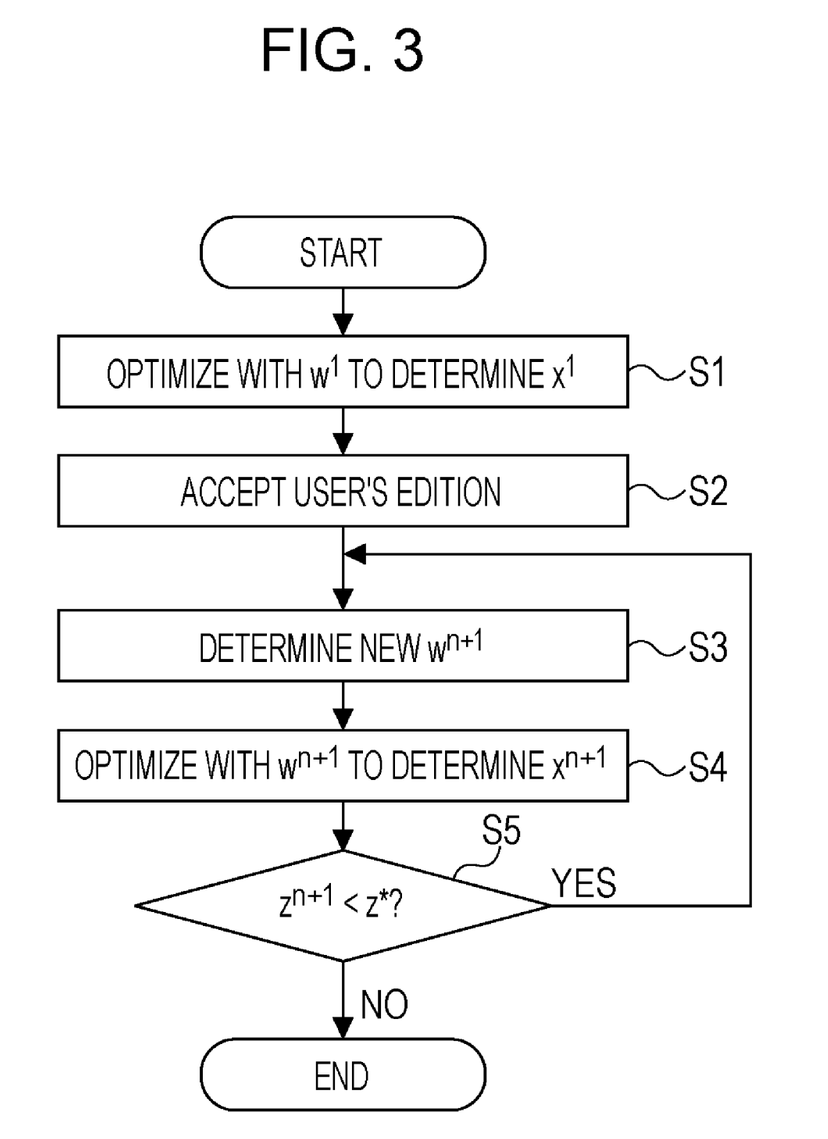
FIG. 3 is a flowchart of weight adjustment processing according to an embodiment of the present invention.

Next, processing of an embodiment of the present invention as shown in FIG. 2 is described. FIG. 3 is a flowchart of weight adjustment processing of this embodiment. FIGS. 4 to 8 are detailed explanatory views of the processing of FIG. 3, which visually illustrate a solution. In this embodiment, a description is given based on linear programming as a simple and easy method.

First, in step S1, the control unit 10 performs optimization with $w^1$ to determine $x^1$. This value is determined through general optimization with the optimization program 22 and derived from the following expression.

$\text{Minimize}(x^1)w^1Z(x^1)=z^1$

[Expression 4]
where x represents a determination variable vector (solution), and a function z of x is an objective function vector. The function z may be an arbitrary one such as a linear or non-linear function. A weight to an item of the target function vector z is $w^1$. An inner product z of x and the weight vector $w^1$ is an objective function. Then, the obtained optimization results are represented by $x^1$ and $z^1$.

Figure 4:
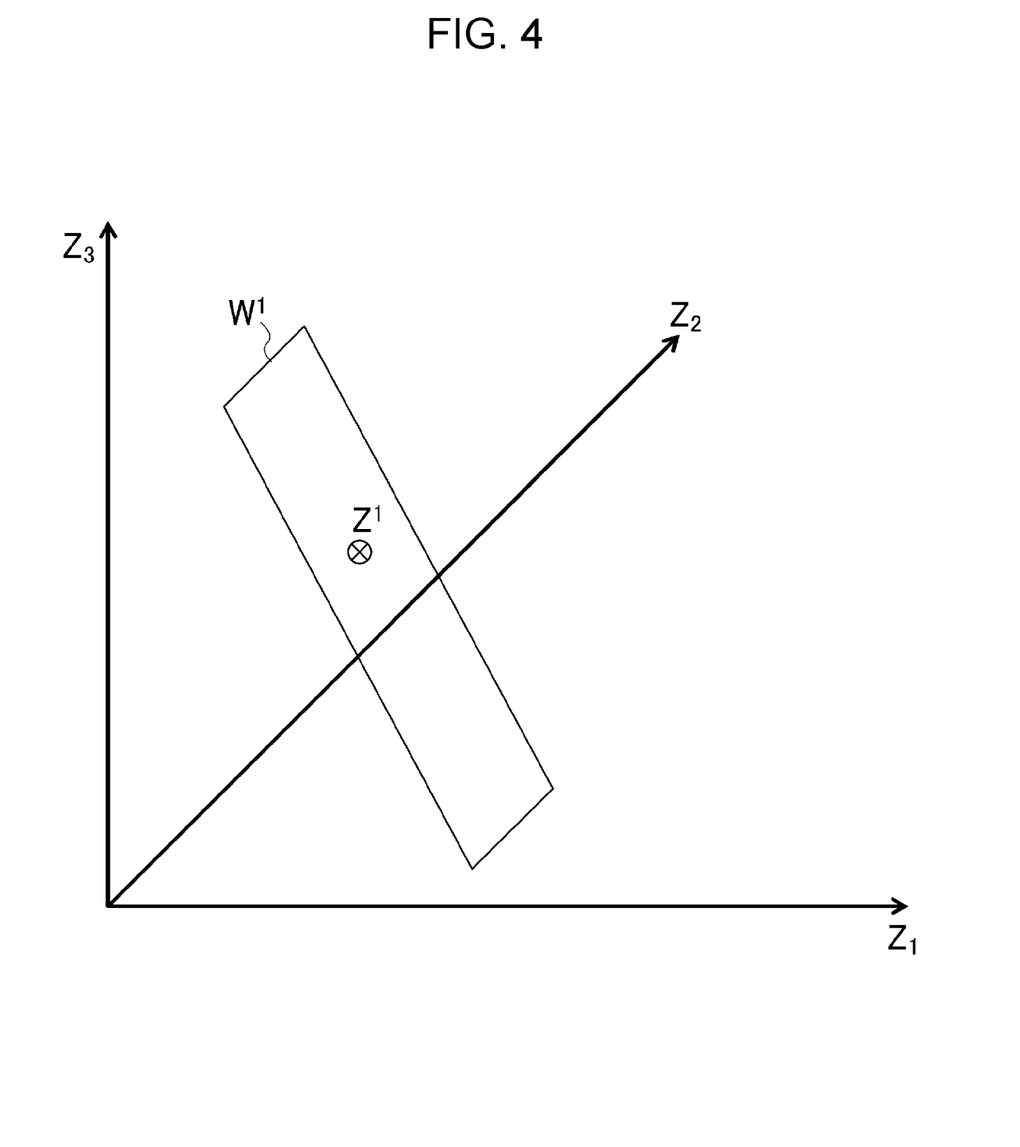
FIG. 4 is an explanatory view for visually illustrating a solution.

[Expression 5]
FIG. 4 shows a solution in step S1. In this example, $w^1$ is a plane (graph) representing a weight vector or a constant objective function plane. Further, $z^1$ is positioned on $w^1$, and represents an optimization result.

Next, in step S2, the control unit 10 accepts a user's editing operation. More specifically, a correction accepting unit 11 receives a solution correction signal from the operational unit 31. The user's edition may be evaluated based on the following expression.

$w^1Z(x')=z'$

[Expression 6]
where x' represents a determination variable vector edited (adjusted) by a user, and z' represents a calculated objective function value.

Figure 5:
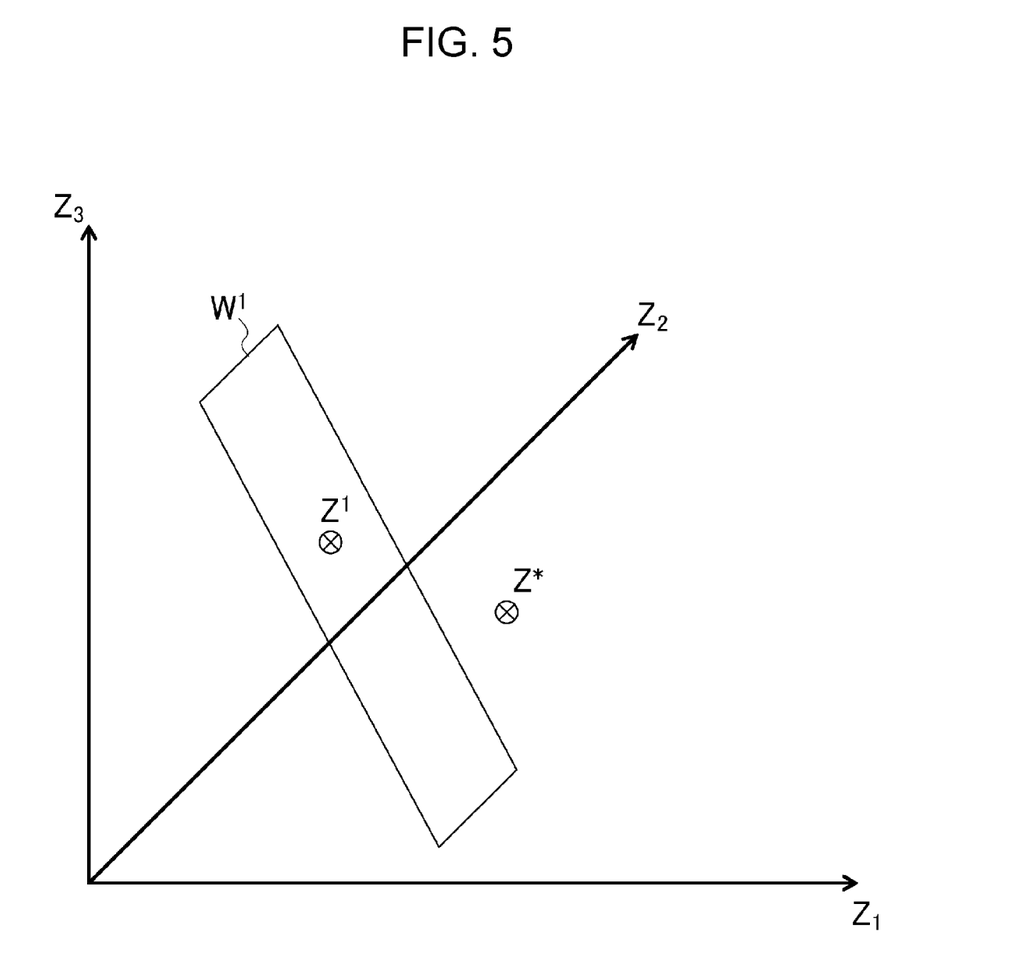
FIG. 5 is an explanatory view for visually illustrating a solution.

[Expression 7]
FIG. 5 shows a solution in step S2. In this example, z' is positioned away on the opposite side of the constant objective function plane $w^1$ on which $z^1$ is, across the origin. As the distance increases, the obtained solution is inferior to a solution derived from $w^1$.

In step S3, the control unit 10 determines a new $w^{n+1}$. More specifically, the weight adjustment unit 12 adjusts a new weight using the weight adjustment program 23 as expressed by the following expression.

[Expression 8]

$$\text{Minimize}(w^{n+1})w^{n+1}Z(x')-z'-kw^{n+1}w^{1T} \quad (4)$$

$$\text{Subject to } w^{n+1}Z(x') \geq z' \quad (5)$$

$$w^{n+1}Z(x^j) \geq z'[j=1\ldots n] \quad (6)$$

Consider a plane in the space z where $w^{n+1}Z=z$ upon determining the new weight vector $w^{n+1}$. More specifically, normalization is carried out under the condition that z=z' to determine a normal vector $w^{n+1}$. The normal vector is formulated through linear programming, followed by optimization. Here, the weight vector $w^{n+1}$ is set as a determination variable. Further, Expression (4) shows an objective function for minimizing a difference from the edited solution and minimizing a difference from the initial weight vector $w^1$. In this example, k represents a factor indicating that an objective for minimizing a difference from the initial weight vector $w^1$ is an auxiliary one, and T represents transposition. Further, Expression (5) shows that the resultant solution is closer to the origin than the edited solution. Expression (6) shows that the resultant solution is closer to the origin than the previous ones. Expressions (5) and (6) show constraints.

Figure 6:
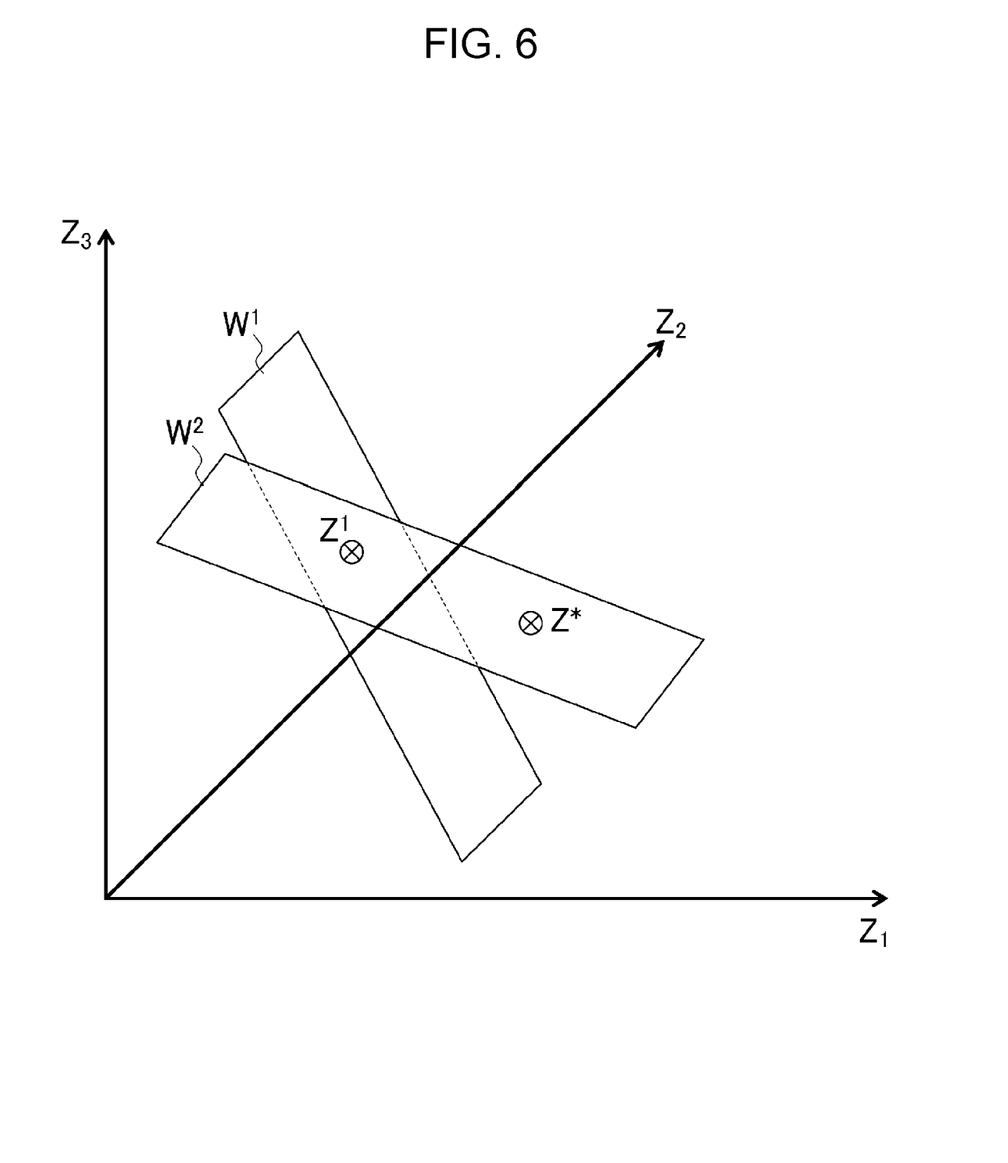
FIG. 6 is an explanatory view for visually illustrating a solution.

[Expression 9]
FIG. 6 shows a solution in step S3. In FIG. 6, a new weight vector $w^2$ is determined, and $z^1$ and z' are positioned on the constant objective function plane $w^2$.

In step S4, the control unit 10 performs optimization with $w^{n+1}$ to determine $x^{n+1}$. More specifically, the optimum solution calculating unit 13 performs optimization with the weight vector $w^{n+1}$ as a weight adjusted with the weight adjustment unit 12 as expressed by the following expression.

$\text{Minimize }(x^{n+1})w^{n-1}Z(x^{n+1})=z^{n+1}$

[Expression 10]
where x represents a determination variable for optimization with the new weight vector $w^{n+1}$. Further, it is efficient to use x' or x" as an initial solution. The obtained optimization results are set as $x^{n+1}$ and $z^{n+1}$.

Figure 7:
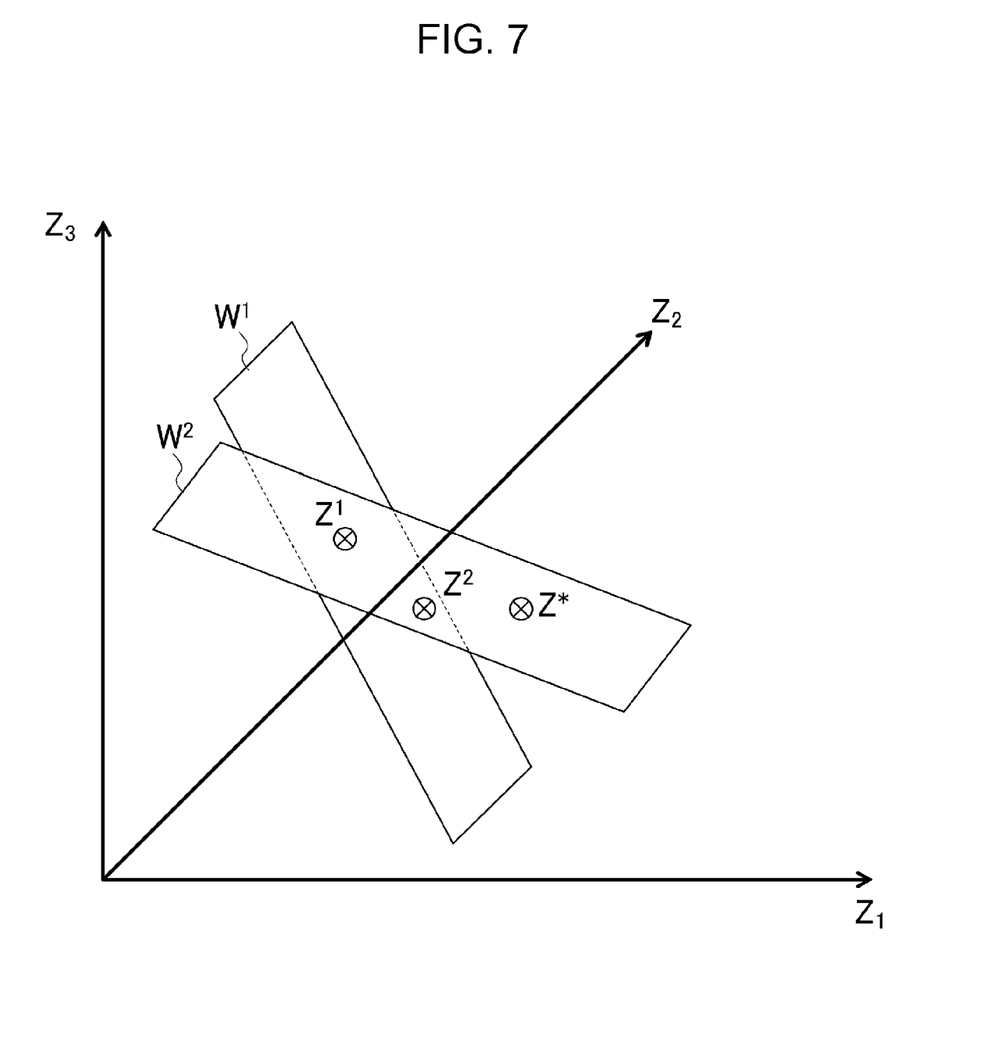
FIG. 7 is an explanatory view for visually illustrating a solution.

[Expression 11]

FIG. 7 shows a solution in step S4. In FIG. 7, a new weight vector $w^2$ is determined, and $z^1$ and z' are positioned on the constant objective function plane $w^2$. In this example, $z^2$ is positioned away on the side closer to the origin (smaller value) then the plane $w^2$.

[Expression 12]

Then, in step S5, the control unit 10 determines whether a solution satisfying a condition of $z^{n+1}$<z' is obtained. The fact a solution satisfying a condition of $z^{n+1}$<z' is obtained means that a solution (more favorable solution) closer to the origin than the constant objective function plane obtained in step S3 is found. If a solution satisfying a condition of $z^{n+1}$<z' is obtained (step S5: YES), the control unit 10 returns the processing to step S3. Then, a solution closer to user's requests is obtained.

Figure 8:
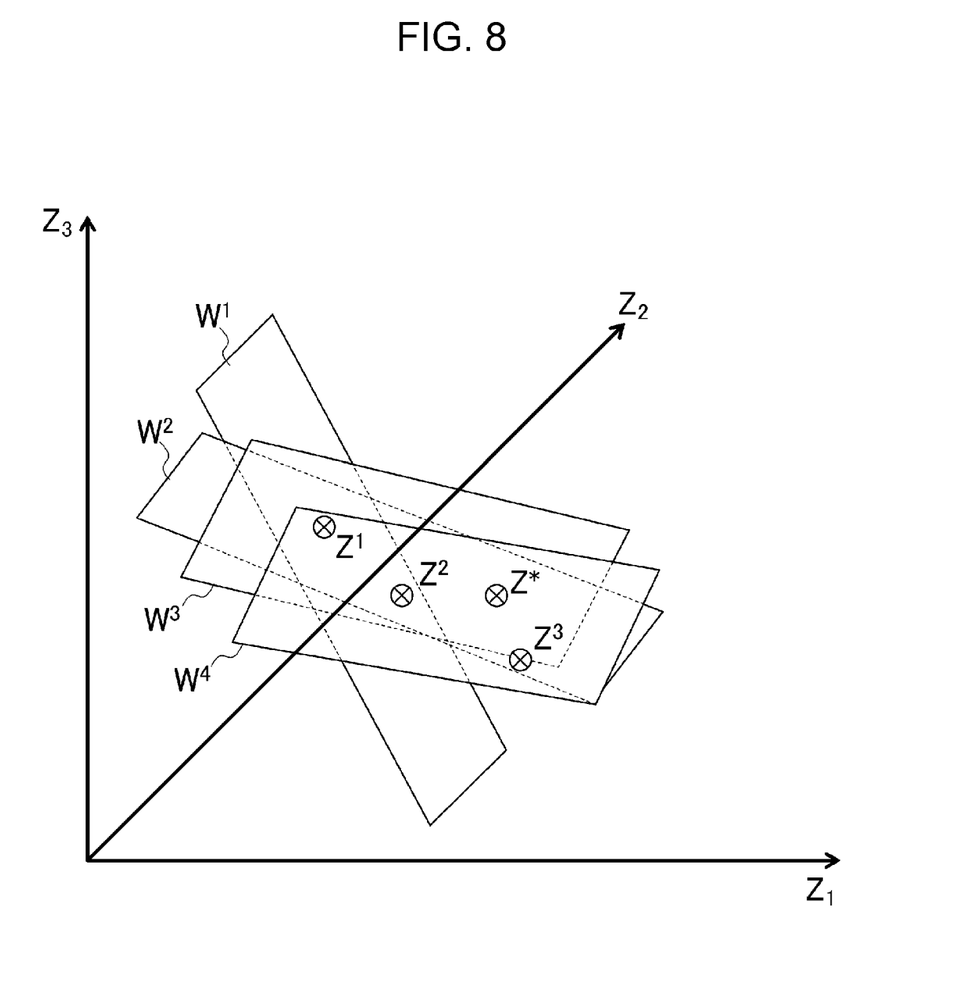
FIG. 8 is an explanatory view for visually illustrating a solution.

[Expression 13]

FIG. 8 shows solutions obtained after the above processing (steps S3 to S8) is repeated several times. New weight vectors $w^3$ and $w^4$ are determined, and $z^1$, z', $z^2$, and $z^3$ are positioned on the constant objective function plane $w^4$ or on the opposite side of the origin.

[Expression 14]

On the other hand, if a solution satisfying a condition of $z^{n+1}$<z' is not obtained (step S5: NO), the control unit 10 terminates the processing. When this processing is terminated, $w^{n+1}$ is used as a new weight vector, and $x^{n+1}$ and $z^{n+1}$ are provided to a user.

Figure 9:
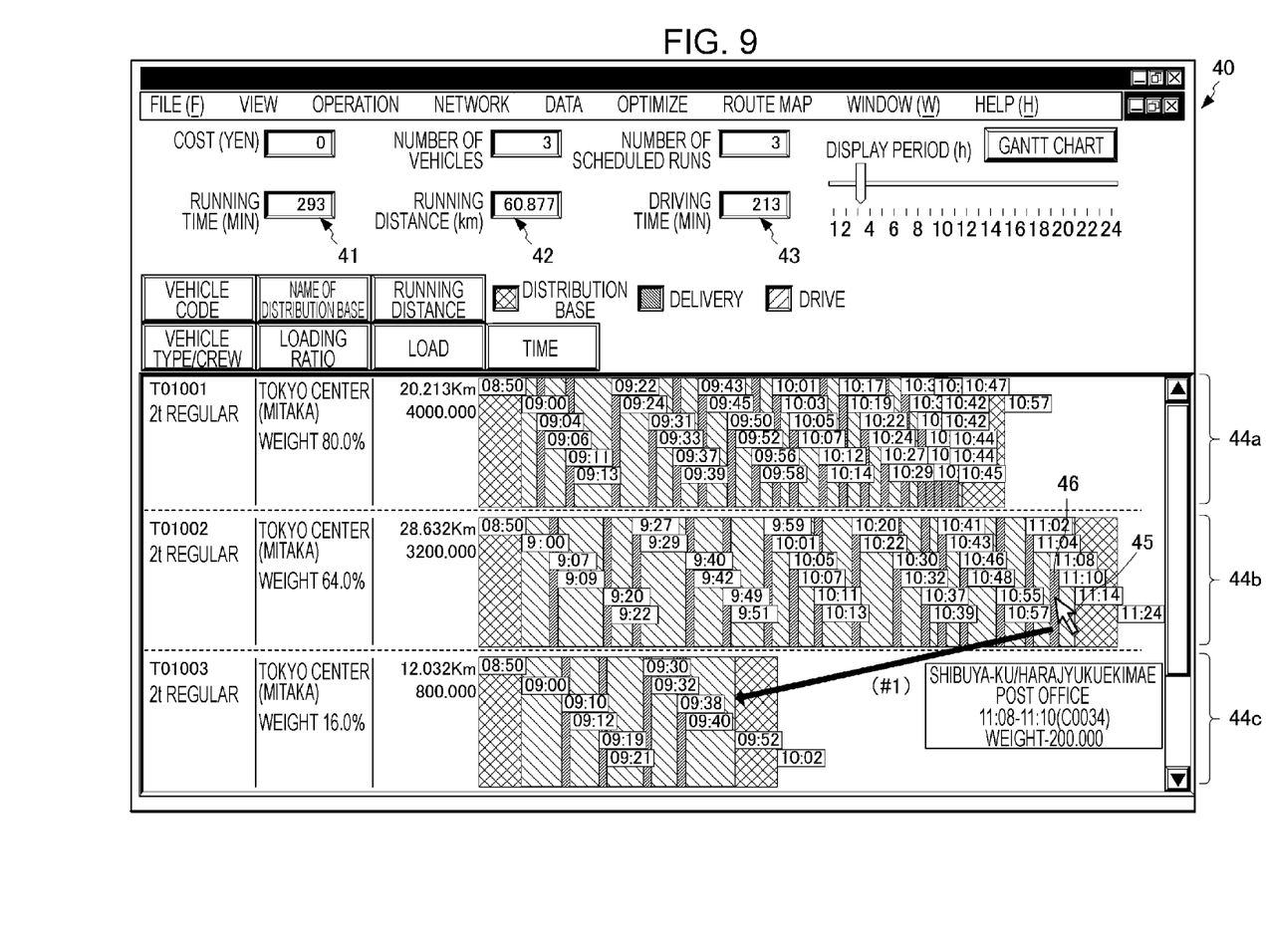
FIG. 9 shows an example of how to use an optimization tool according to an embodiment of the present invention.
Figure 10:
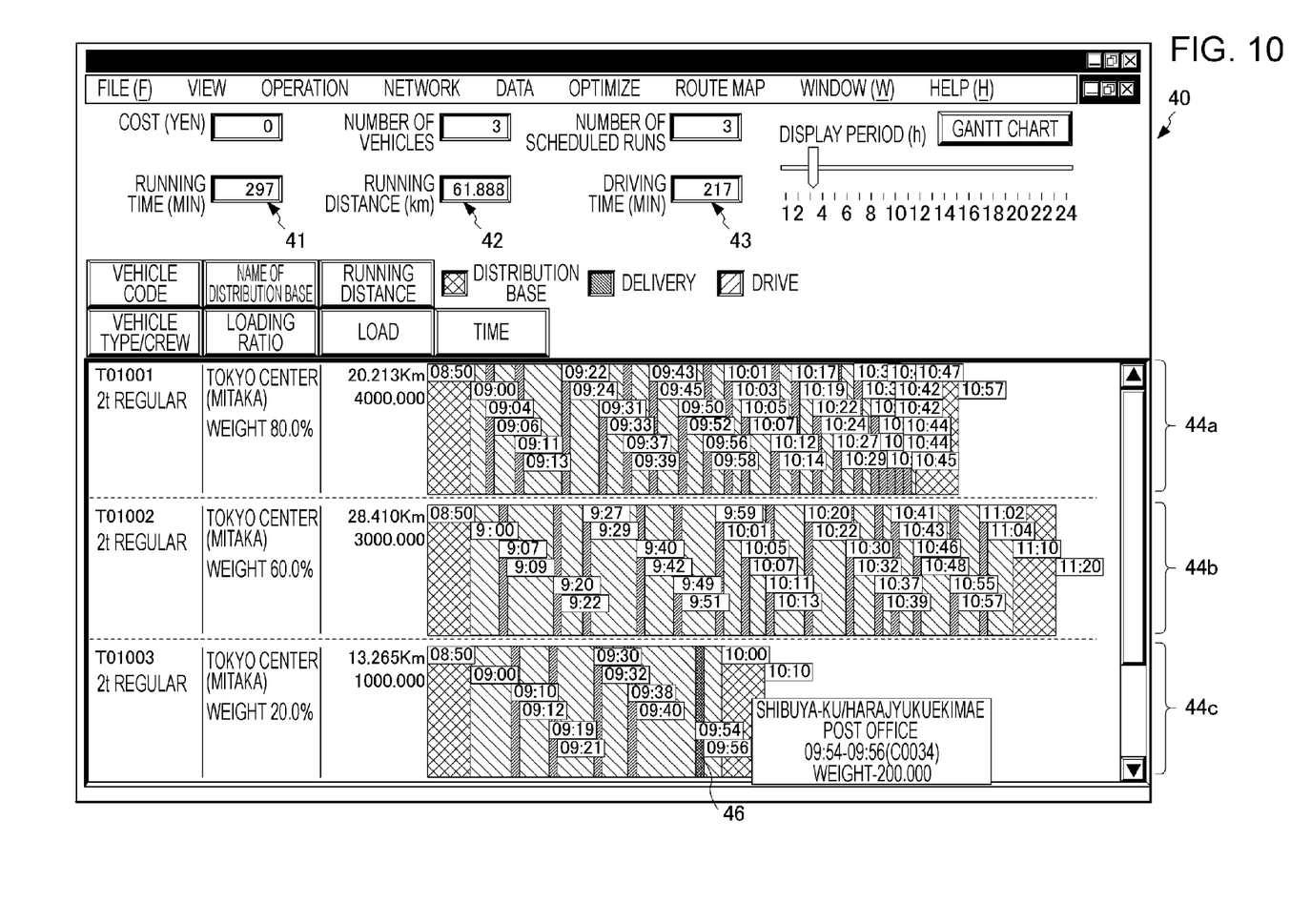
FIG. 10 shows an example of how to use an optimization tool according to an embodiment of the present invention.
Figure 11:
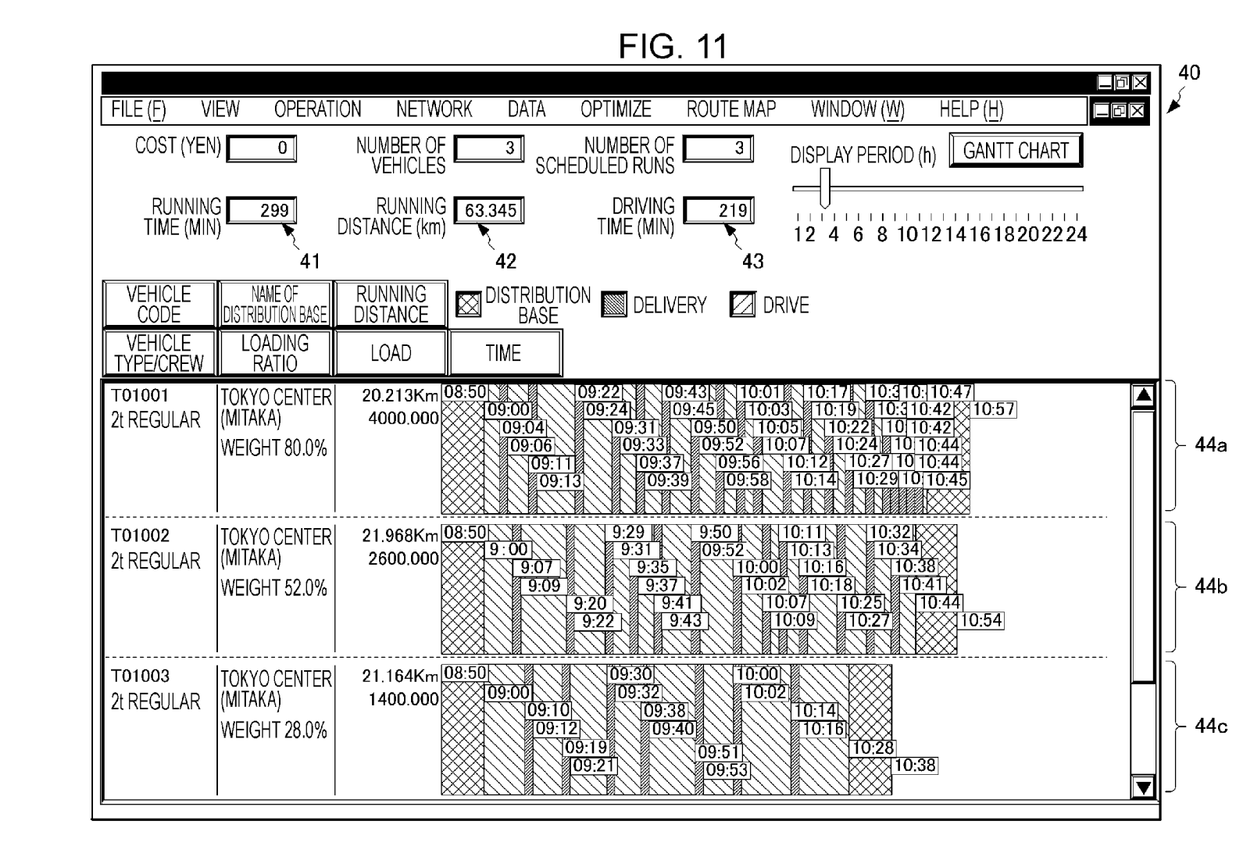
FIG. 11 shows an example of how to use an optimization tool according to an embodiment of the present invention.

Next, an example of how to use the optimization tool is described. FIGS. 9 to 11 show an example of how to use an optimization tool of this embodiment. In the examples of FIGS. 9 to 11, optimum delivery routes of three vehicles are determined and displayed.

To begin with, FIG. 9 shows a GUI screen 40 displaying an optimization result of the optimization program 22 with an optimization tool. The display unit 32 of the multi-objective optimization apparatus 1 (see FIG. 1) displays the GUI screen 40 of FIG. 9. A working time unit 41 indicates the total working time of three vehicles. Further, a running distance unit 42 and a running time unit 43 indicate the total running distance and running time of the three vehicles. Moreover, Gantt chart units 44a to 44c show Gantt charts indicating optimum delivery routes of the three vehicles.

Here, if a user plans to move some of tasks of the Gantt chart unit 44b to the Gantt chart unit 44c the total load of which is low to average the operation, the user can move the task by moving an cursor 45 on the GUI screen 40 through operations of the operational unit 31 (FIG. 1). More specifically, a user can move a task 46 representing a delivery task from "11:08" to "11:10" from the Gantt chart unit 44b to the Gantt chart unit 44c by moving the cursor 45 to the task 46 dragging and dropping the cursor (#1).

FIG. 10 shows the GUI screen 40 that is changed by moving the task 46. In FIG. 10, the Gantt chart is changed in accordance with the movement in FIG. 9. In the Gantt chart unit 44b, a result of recalculation performed in response to deletion of the task 46 is displayed. Further, the Gantt chart unit 44c indicates a result of recalculation performed in response to the addition of the task 46. Along with the recalculation, values of the working time unit 41, the running distance unit 42, and the running time unit 43 are displayed as recalculated values.

The above operations are to change a solution by a user. The operations could be performed with existing methods. However, after this operation, the control unit 10 of the multi-objective optimization apparatus 1 displays a corrected solution in response to movement of the task as well as determines a new weight. In other words, the value of the working time unit 41 of FIG. 10 is longer than that of FIG. 9. However, as understood from the Gantt chart, or the running distance or load, the tasks are averaged among the vehicles. As a result of correcting a solution by a user, the working time is averaged and reweighted. After that, optimization is performed again based on the new weight of the objective function.

FIG. 11 shows the GUI screen 40 displaying an optimum solution as the optimization result. As apparent from FIG. 11, some of the tasks of the Gantt chart unit 44b are moved to the Gantt chart unit 44c. As understood from the working time unit 41, a working time becomes longer, but tasks are optimally divided among the averaged to level out the load.

In this example, a solution obtained after movement of tasks as shown in FIG. 10 is illustrated, but the GUI screen 40 may be shifted directly from FIG. 9 to FIG. 11, not through FIG. 10.

Figure 12:
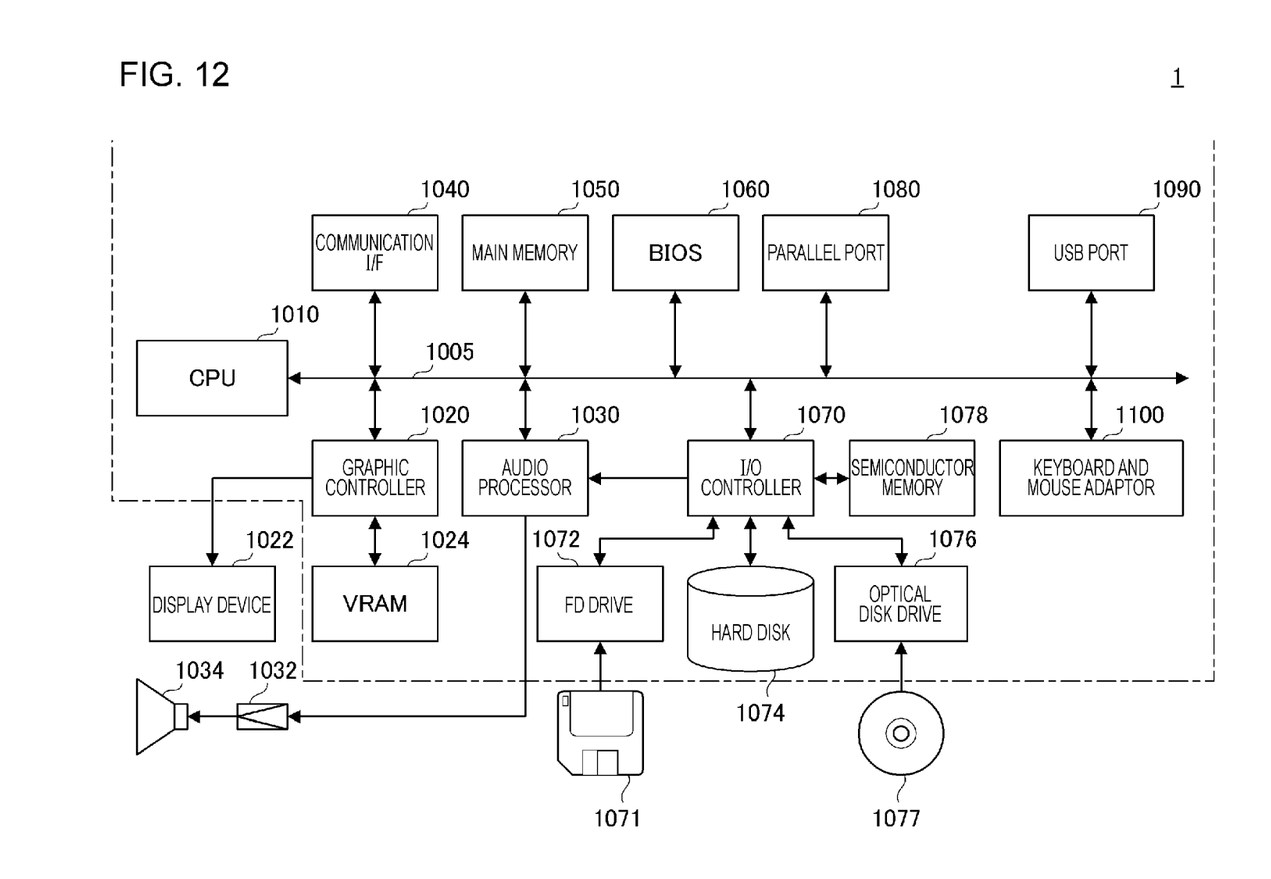
FIG. 12 shows hardware configuration of a multi-objective optimization apparatus according to an embodiment of the present invention.

FIG. 12 shows the hardware configuration of the multi-objective optimization apparatus 1 according to the embodiment of the present invention. The following description is directed to the general configuration of an information processor typified by a computer. However, if any special device or incorporated device is used, the minimum configuration can be, of course, selected in accordance with its environments.

The multi-objective optimization apparatus 1 includes a CPU (Central Processing Unit) 1010, a bus line 1005, a communication I/F 1040, a main memory 1050, a BIOS (BasicInputOutputSystem) 1060, a parallel port 1080, a USB port 1090, a graphic controller 1020, a VRAM 1024, an audio processor 1030, an I/O controller 1070, and input means such as a keyboard and mouse/adaptor 1100. The I/O controller 1070 is connectable with storage means such as a flexible disk (FD) drive 1072, a hard disk 1074, an optical disk drive 1076, and a semiconductor memory 1078. The graphic controller 1020 is connected to the display device 1022. Further, the audio processor 1030 is optionally connected to an amplifier circuit 1032 and a speaker 1034.

The BIOS 1060 stores a boot program executed by the CPU 1010 at the time of starting the multi-objective optimization apparatus 1 and a program dependent on hardware of the multi-objective optimization apparatus 1. The FD drive 1072 reads programs or data from the flexible disk 1071 and supplies the read programs or data to the main memory 1050 or the hard disk 1074 through the I/O controller 1070.

Examples of the optical disk drive 1076 include a DVD-ROM drive, a CD-ROM drive, a DVD-RAM drive, and a CD-RAM drive. In this case, an optical disk 1077 suitable for each drive may be used. The optical disk drive 1076 may read programs or data from the optical disk 1077 and supply the programs or data to the main memory 1050 or the hard disk 1074 through the I/O controller 1070.

The computer program supplied to the multi-objective optimization apparatus 1 is stored in a recording medium such as the flexible disk 1071, the optical disk 1077, or a memory card and supplied to a user. The computer program is read from the recording medium through the I/O controller 1070 or downloaded through the communication I/F 1040 and then installed and executed on the multi-objective optimization apparatus 1. How the computer program causes the information processor to execute operations is similar to that of the above apparatus and thus not described.

The above computer program may be stored in an external storage medium. Examples of the storage medium include a magneto-optical recording medium such as an MD and a tape medium in addition to the flexible disk 1071, the optical disk 1077, and the memory card. Further, it is possible to use a storage device such as a hard disk in a server system connected to a dedicated communication line or Internet or an optical disk and a library as a recording medium and supply the computer program to the multi-objective optimization apparatus 1 through a communication line.

The above example mainly describes the multi-objective optimization apparatus 1, and if a program having the above function of the information processor is installed to a computer and the computer functions as the information processor, functions similar to those of the above information processor can be realized. Hence, the information processor discussed as one embodiment of the present invention may be accomplished in the form of computer program.

The multi-objective optimization apparatus 1 of the present invention may be implemented in the form of hardware, software, or combination of hardware and software. The combination of hardware and software is typified by the configuration of a computer system including a predetermined program. In such cases, the predetermined program is loaded to the computer system and executed to thereby cause the computer system to execute the processing of the present invention. The program is composed of a command group that can be represented by any language, code, or notation. Such a command group allows the system to execute a particular function directly or after one or both of (1) conversion to another language, code, or format and (2) copying to another medium. Needless to say, the present invention is not limited to the program only but encompasses a program product inclusive of a medium recording the program. A program for realizing the functions of the present invention can be stored in any computer-readable medium such as a flexible disk, a CD-ROM, a DVD, a hard disk device, a ROM, an MRAM, or a RAM. Such a program may be downloaded from another computer connected to a communication line or copied from another medium so as to store the program to the computer-readable medium. Further, such a program may be compressed or divided into plural subprograms and stored in one or plural recording mediums.

The present invention is described based on the embodiment, but the present invention is not limited to the above embodiment. Further, effects of the embodiment of the present invention are described as an example of the beneficial effects of the present invention, and an advantage of the present invention is not limited by the embodiment or examples of the present invention.

The present invention can be changed and modified in various ways, not limited to the above embodiment, and the modifications and changes are included in the scope of the present invention.

In this embodiment, weighting is performed through linear programming for optimization. However, another method may be used. For example, if an executable solution is positioned in a multidimensional space of an evaluation item, and a hyperplane of a convex hull thereof is determined, similar operations can be performed.

This embodiment is described based on the optimization of a delivery route. However, the present invention is applicable to any business using the other optimization methods. The present invention can be applied to optimization for arterial road delivery or steel production plan, for example, optimization that requires contradictory determination such that cost and risk are reduced.

| Reference Numerals | |
|---|---|
| 1: | multi-objective optimization apparatus |
| 10: | control unit |
| 11: | correction accepting unit |
| 12: | weight adjustment unit |
| 13: | optimum solution calculating unit |
| 14: | GUI unit |
| 20: | storage unit |
| 21: | program storage unit |
| 22: | optimization program |
| 23: | weight adjustment program |
| 24: | data storage unit |
| 25: | temporary storage unit |
| 31: | operational unit |
| 32: | display unit |
| 40: | GUI screen |

The invention claimed is:

1. An apparatus for optimizing a set of vehicle routes of travel comprising:
a correction accepting unit receiving corrections for a plurality of evaluation parameters associated with segments of the set of vehicle routes of travel to calculate an improved set of vehicle routes of travel using the plurality of corrected evaluation parameters;
a weight adjustment unit adjusting weights of the plurality of evaluation parameters based on the corrections for the evaluation parameters;
an optimum solution calculating unit calculating the improved set of vehicle routes of travel, based on the adjusted weights of the plurality of evaluation parameters; and
a display unit displaying an improved set of vehicle routes of travel.

2. The apparatus according to claim 1, wherein the weight adjustment unit adjusting weights of the plurality of evaluation parameters based on the corrections for the evaluation parameters comprises:
making the adjustments to the weights of the plurality of evaluation parameters by determining the adjusted weights of the plurality of evaluation parameters resulting in an improvement to an objective for the set of vehicle routes of travel.

3. The apparatus according to claim 1, wherein the weight adjustment unit uses a result obtained through linear programming.

4. The apparatus according to claim 1, wherein the weight adjustment unit adjusts weights of the plurality of evaluation parameters by determining an adjusted weight in the adjusted weights of the plurality of evaluation parameters that minimizes a difference between the set of vehicle routes of travel and the improved set of vehicle routes of travel.

5. A weight adjustment method for adjusting weights of a plurality of evaluation parameters for optimizing a set of vehicle routes of travel executed by a computing system, comprising:
 a processor in the computing system configured to perform a correcting step for receiving corrections for a plurality of evaluation parameters associated with segments of the set of vehicle routes of travel to calculate an improved set of vehicle routes of travel using the plurality of corrected evaluation parameters;
 a processor in the computing system configured to perform an adjusting step for adjusting weights of the plurality of evaluation parameters based on the corrections for the evaluation parameters;
 a processor in the computing system configured to perform a calculating step for an optimum solution calculating unit calculating the improved set of vehicle routes of travel, based on the adjusted weights of the plurality of evaluation parameters; and
 a processor in the computing system configured to perform a displaying step of displaying an improved set of vehicle routes of travel.

6. The weight adjustment method according to claim 5, wherein the weight adjustment unit adjusts weights of the plurality of evaluation parameters by determining an adjusted weight in the adjusted weights of the plurality of evaluation parameters that minimizes a difference between the set of vehicle routes of travel and the improved set of vehicle routes of travel.

7. The weight adjustment method according to claim 5, wherein the adjusting step includes adopting a result obtained through linear programming.

8. The weight adjustment method according to claim 5, wherein the weight adjustment unit adjusts weights of the plurality of evaluation parameters by determining an adjusted weight in the adjusted weights of the plurality of evaluation parameters that minimizes a difference between the set of vehicle routes of travel and the improved set of vehicle routes of travel.

9. A weight adjustment program product comprising storage type computer readable medium comprising computer readable program code for causing a computer to perform a weight adjustment method of adjusting weights of a plurality of evaluation parameters for optimizing a set of vehicle routes of travel, said computer program product comprising:
 computer readable code for for receiving corrections for a plurality of evaluation parameters associated with segments of the set of vehicle routes of travel to calculate an improved set of vehicle routes of travel using the plurality of corrected evaluation parameters;
 computer readable code for adjusting weights of the plurality of evaluation parameters based on the corrections for the evaluation parameters;
 computer readable code for calculating an improved set of vehicle routes of travel based on the adjusted weights of the plurality of evaluation parameters; and
 computer readable code for displaying an improved set of vehicle routes of travel.

10. The weight adjustment program product according to claim 9, wherein the adjusting weights step adjusting weights of the plurality of evaluation parameters based on the corrections for the evaluation parameters comprises:
 making the adjustments to the weights of the plurality of evaluation parameters by determining the adjusted weights of the plurality of evaluation parameters resulting in an improvement to an objective for the set of vehicle routes of travel.

11. The weight adjustment program product according to claim 9, wherein the adjusting weights step includes adopting a result obtained through linear programming.

12. The apparatus of claim 1, wherein calculating the improved set of vehicle routes of travel, based on the adjusted weights of the plurality of evaluation parameters further comprises:
 determining whether an adjusted weight in the adjusted weights of the plurality of evaluation parameters satisfies a condition of a product of the adjusted weight and a weight factor being less than a value returned by an objective function of the set of vehicle routes of travel; and
 if the solution satisfies the condition, the improved set of vehicle routes of travel is calculated using the adjusted weight.

13. The apparatus of claim 2, wherein the objective is a first objective of a plurality of objectives and further comprising:
 making the adjustments to the weights of the plurality of evaluation parameters by determining the adjusted weights of the plurality of evaluation parameters resulting in an improvement to an overall improvement to a plurality of objectives for the set of vehicle routes of travel.

14. The apparatus of claim 3, wherein the result used by the weight adjustment unit comprises a product of a weight in the weights of the plurality of evaluation parameters and a value corresponding to an objective of the improved set of vehicle that is returned by a function using the evaluation parameters of the set of vehicle routes of travel.

15. The apparatus of claim 1 further comprising:
 a control unit determines whether a value returned by a function using the evaluation parameters, the value corresponding to an objective of the improved set of vehicle routes of travel, is equivalent or superior to a value returned by the function using the evaluation parameters corresponding to a previous set of vehicle travel routes; and
 responsive to the value corresponding to the evaluation parameters of the improved set of vehicle routes of travel not being equivalent or superior to the value returned by the function using the evaluation parameters corresponding to a previous set of vehicle travel routes, performing a new weight adjustment calculation to adjust the weight of the evaluation parameters to recalculate the improved set of vehicle routes of travel.

16. The weight adjustment method according to claim 5, wherein calculating the improved set of vehicle routes of travel, based on the adjusted weights of the plurality of evaluation parameters comprises:
 a processor in the computer system configured to perform an determining step of determining whether an adjusted weight in the adjusted weights of the plurality of evaluation parameters satisfies a condition of a product of the adjusted weight and a weight factor being less than a value returned by an objective function of the set of vehicle routes of travel; and a processor in the computer system configured to perform a calculating step of calculating, if the solution satisfies the condition, the improved set of vehicle routes of travel is calculated using the adjusted weight.

17. The weight adjustment method according to claim 6, wherein the objective is a first objective of a plurality of objectives and further comprising:
a processor in the computing system configured to make the adjustments to the weights of the plurality of evaluation parameters by determining the adjusted weights of the plurality of evaluation parameters resulting in an improvement to an overall improvement to a plurality of objectives for the set of vehicle routes of travel.

18. The apparatus of claim 7, wherein the result used by the weight adjustment unit comprises a product of a weight in the weights of the plurality of evaluation parameters and a value corresponding to an objective of the improved set of vehicle that is returned by a function using the evaluation parameters of the set of vehicle routes of travel.

19. The weight adjustment method according to claim 5, further comprising:
a processor in the computing system configured to determine whether a value returned by a function using the evaluation parameters, the value corresponding to an objective of the improved set of vehicle routes of travel, is equivalent or superior to a value returned by the function using the evaluation parameters corresponding to a previous set of vehicle travel routes; and
responsive to the value corresponding to the evaluation parameters of the improved set of vehicle routes of travel not being equivalent or superior to the value returned by the function using the evaluation parameters corresponding to a previous set of vehicle travel routes, a processor in the computing system configured to perform a new weight adjustment calculation to adjust the weight of the evaluation parameters to recalculate the improved set of vehicle routes of travel.

20. The weight adjustment program product according to claim 9, wherein calculating the improved set of vehicle routes of travel, based on the adjusted weights of the plurality of evaluation parameters comprises:
computer readable code for determining whether an adjusted weight in the adjusted weights of the plurality of evaluation parameters satisfies a condition of a product of the adjusted weight and a weight factor being less than a value returned by an objective function of the set of vehicle routes of travel; and
computer readable code for calculating, if the solution satisfies the condition, the improved set of vehicle routes of travel is calculated using the adjusted weight.

21. The weight adjustment program product according to claim 10, wherein the objective is a first objective of a plurality of objectives and further comprising:
making the adjustments to the weights of the plurality of evaluation parameters by determining the adjusted weights of the plurality of evaluation parameters resulting in an improvement to an overall improvement to a plurality of objectives for the set of vehicle routes of travel.

22. The apparatus of claim 11, wherein the result used by the weight adjustment unit comprises a product of a weight in the weights of the plurality of evaluation parameters and a value corresponding to an objective of the improved set of vehicle that is returned by a function using the evaluation parameters of the set of vehicle routes of travel.

23. The weight adjustment method according to claim 9, further comprising:
computer readable code for determining whether a value returned by a function using the evaluation parameters, the value corresponding to an objective of the improved set of vehicle routes of travel, is equivalent or superior to a value returned by the function using the evaluation parameters corresponding to a previous set of vehicle travel routes; and
responsive to the value corresponding to the evaluation parameters of the improved set of vehicle routes of travel not being equivalent or superior to the value returned by the function using the evaluation parameters corresponding to a previous set of vehicle travel routes, computer readable code for performing a new weight adjustment calculation to adjust the weight of the evaluation parameters to recalculate the improved set of vehicle routes of travel.

* * * * *